US007688963B1

(12) United States Patent
Lang

(10) Patent No.: US 7,688,963 B1
(45) Date of Patent: Mar. 30, 2010

(54) APPARATUS AND METHOD FOR PROCESSING CALL DISCONNECTS

(75) Inventor: Daryl Ufra Lang, Aurora, CO (US)

(73) Assignee: Avaya Inc, Basking Ridge, NJ (US)

( * ) Notice: Subject to any disclaimer, the term of this patent is extended or adjusted under 35 U.S.C. 154(b) by 1134 days.

(21) Appl. No.: 10/851,943

(22) Filed: May 21, 2004

(51) Int. Cl.
*H04M 3/42* (2006.01)
*H04M 3/00* (2006.01)

(52) U.S. Cl. ............................... 379/215.01; 379/265.02

(58) Field of Classification Search ............ 379/215.01, 379/15.05, 265.02, 265.12, 266.01, 265.07, 379/207.01
See application file for complete search history.

(56) References Cited

U.S. PATENT DOCUMENTS

| | | | | |
|---|---|---|---|---|
| 5,699,402 A | * | 12/1997 | Bauer et al. | 379/29.09 |
| 6,014,439 A | * | 1/2000 | Walker et al. | 379/266.01 |
| 6,345,093 B1 | * | 2/2002 | Lee et al. | 379/265.12 |
| 6,600,821 B1 | * | 7/2003 | Chan et al. | 379/265.07 |
| 6,724,885 B1 | * | 4/2004 | Deutsch et al. | 379/265.02 |
| 6,768,722 B1 | * | 7/2004 | Katseff et al. | 370/260 |
| 7,123,707 B1 | * | 10/2006 | Hiri et al. | 379/215.01 |
| 7,212,625 B1 | * | 5/2007 | McKenna et al. | 379/266.01 |
| 2002/0146106 A1 | * | 10/2002 | Himmel et al. | 379/215.01 |
| 2003/0048878 A1 | * | 3/2003 | Drury et al. | 379/14.01 |
| 2004/0198366 A1 | * | 10/2004 | Crocker et al. | 455/452.1 |
| 2006/0018456 A1 | * | 1/2006 | Kunkel | 379/265.02 |
| 2006/0109783 A1 | * | 5/2006 | Schoeneberger et al. | 370/217 |
| 2006/0171519 A1 | * | 8/2006 | Shaffer et al. | 379/215.01 |

* cited by examiner

*Primary Examiner*—William J Deane
(74) *Attorney, Agent, or Firm*—John C. Moran

(57) ABSTRACT

A method and system process call path interruptions by detecting an interruption of a call path to a first telecommunication terminal during a telecommunication call, selecting by a second telecommunication terminal that remains on the telecommunication call another telecommunication endpoint to which to transfer the telecommunication call, and establishing the telecommunication call between the second telecommunication terminal and the other telecommunication endpoint.

12 Claims, 6 Drawing Sheets

APPARATUS AND METHOD FOR PROCESSING CALL DISCONNECTS

TECHNICAL FIELD

This invention relates to communication systems in general, and in particular, the processing of telecommunication calls.

BACKGROUND OF THE INVENTION

Within the art, call centers are an important element in providing customer service for a variety of industries. A large call center will have thousands of agents working at any given time. One of the problems in the management of the call center is that the peak times when the maximum number of agents are required can be predicted but may only last an hour or two, if that long. The problem this presents to the management of the call center is in having to have a number of agents present working eight hour shifts to handle these brief peak periods. One of the ways that this problem has been solved in the prior art is to utilize remote agents interconnected to the call center management system but who are working at home. This allows the agents to work part-time and to remain in their own home.

In a modern call center, for an agent to perform their activities they not only need audio communication with the customer or client who is being assisted but also they need to access a central base to obtain the necessary information in order to provide the desired assistance. Within the prior art it is known to remote agents via digital transmission systems such as the Internet or other forms of wide area networking. The secondary advantage of utilizing a digital transmission scheme for both voice and data is that long distance telephone charges are normally avoided while the agent is working. A remote agent utilizes a computer, such as a personal computer, that is being used as an IP Softphone. The personal computer both communicates the necessary data to and from the remote agent as well audio information. Whereas conceptually the interconnection of remote agents into a call center management system via a digital transmission media such as the Internet is attractive, but a digital network outage will cause the connection between the remote agent and the client to be interrupted and lost. The result is that the client then has to redial the call center management system and be placed into a waiting queue until the same or another agent can assist them.

Within the prior art, it is known to provide only the data over the digital transmission system for the utilization of the remote agent and to provide an audio communication link via the public telephone switching network. The disadvantage of this system is the requirement to have both a data transmission link and a telephone link active at the same time. In addition, long distance charges may accrue on the public telephone switching network link.

In addition, wireless switching systems (also referred to as cellular systems) are known to suffer from calls being disconnected due to call path interruptions. Such interruptions require one of the two parties to reestablish the call.

SUMMARY OF THE INVENTION

A method and system process call path interruptions by detecting an interruption of a call path to a first telecommunication terminal during a telecommunication call, selecting by a second telecommunication terminal that remains on the telecommunication call another telecommunication endpoint to which to transfer the telecommunication call, and establishing the telecommunication call between the second telecommunication terminal and the other telecommunication endpoint.

DETAILED DESCRIPTION

Figure 1:
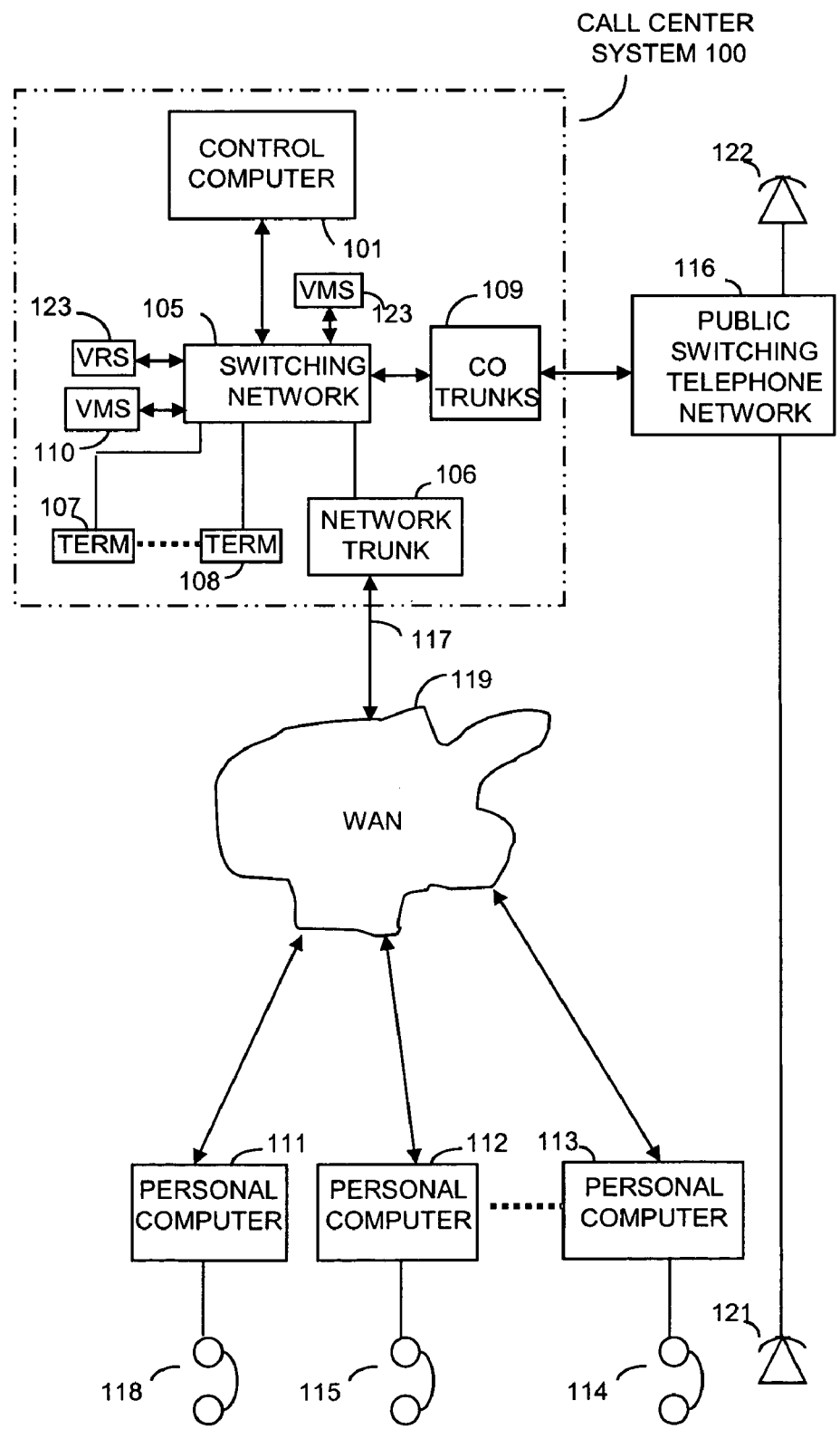
FIG. 1 illustrates an embodiment.

FIG. 1 illustrates, in block diagram form, an embodiment for implementing the invention. Call center system 100 is providing the overall call center functions. System 100 can, for example, be an Enterprise Communication System from Avaya, Inc. with automatic call distribution features. System 100 interfaces to public switching telephone network 116 via CO trunks 109. Public switching network 116 allows customers or clients utilizing a telephone such as telephone 122 to place calls to call center system 100. Call center system 100 utilizes internal agents using telephone and display sets 107 through 108 and also by using remote agents that are utilizing personal computers 111 through 113. One skilled in the art would recognize that devices other than personal computers could be utilized by the remote agents. The remote agents' personal computers are interconnected to call center system 100 via wide area network (WAN) 119 via trunk 117. Network trunk 106 of system 100 interfaces the WAN 119 to switching network 105 for voice and control information. Each personal computer such as personal computer 111 is performing an IP Softphone function utilizing handsets such as handset 118. In addition, personal computer 111 would provide a data interface for the remote agent utilizing input devices and output devices. More detail on the personal computer is given with respect to FIG. 3. The remote agents utilizing personal computers 111 and 112 only have an audio path set up through WAN 119. However, the agent utilizing personal computer 113 has an audio path capability through WAN 119 and in addition has telephone 121 to which call center system 100 can direct voice information via public switching network 116.

Figure 2:
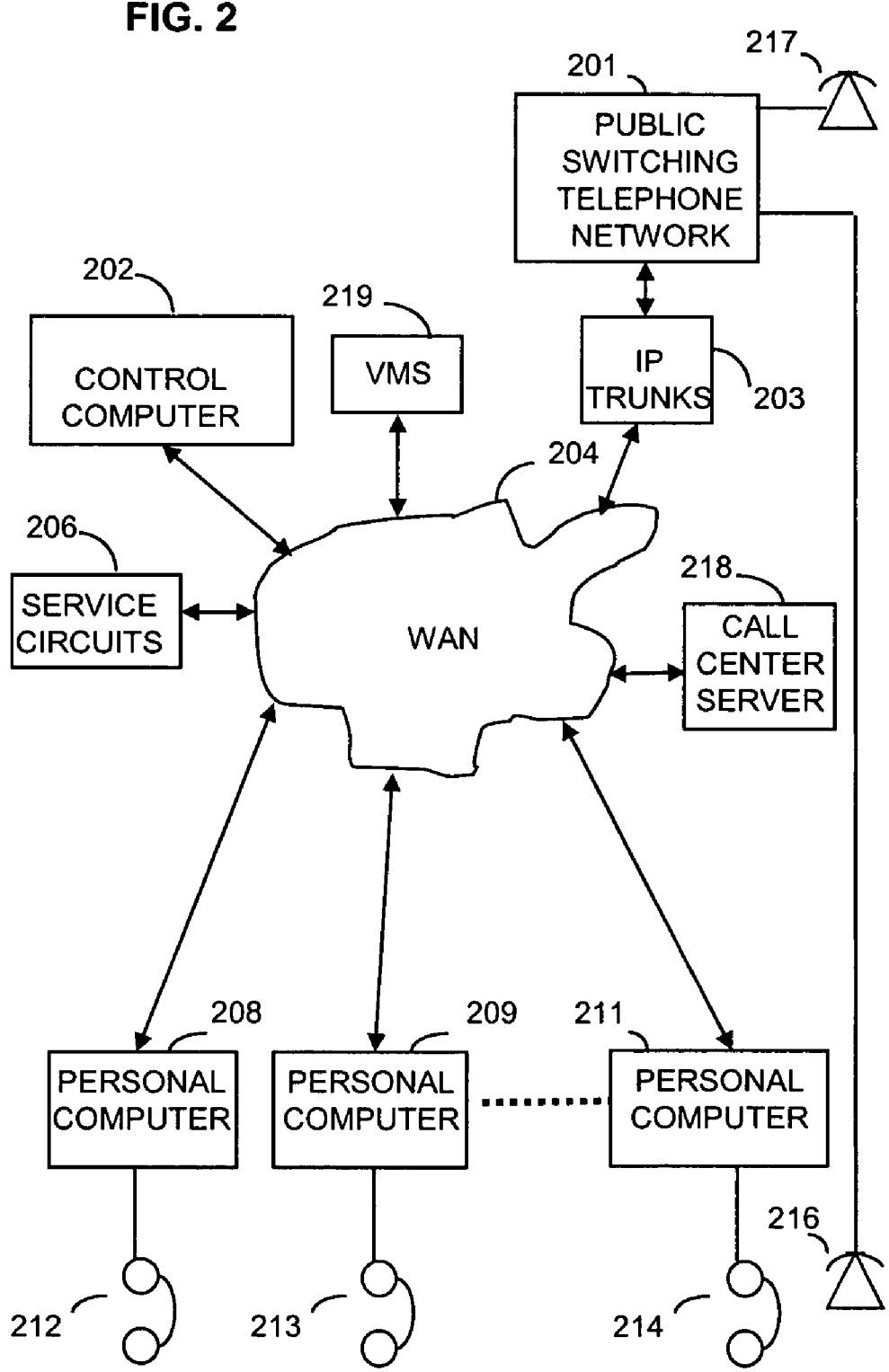
FIG. 2 illustrates, in block diagram form, another embodiment.

FIG. 2 illustrates, in block diagram form, another embodiment for implementing the invention. In FIG. 2, control computer 202 is providing the overall call control. Control computer 202 utilizes service circuits 206 to perform functions such as conferencing and voice response, etc. Calls are received from public switching network 201 via IP trunks 203. WAN 204 provides the networking capabilities. In one embodiment, control computer 202 provides the call center operations by utilizing personal computers 208 through 211 which are operated by agents. In addition, the agent utilizing personal computer 211 also can have a voice path set up through public switching network 201 to handle voice information or the voice information can be communicated through WAN 204.

In another embodiment, call center server 218 provides all of the call center operations. As an agent becomes active on a personal computer, such as personal computer 211, call center server 218 then establishes itself as the agent with the agent's telephone number to control computer 202. Control computer 202 will then direct calls to the personal computer via call center server 218. In addition, as calls are received from clients utilizing, for example, telephone 217 via public switching telephone network 201, control computer 202 will direct these calls to call center server 218 which will perform the call center activities. If call center server 218 determines that the voice path to personal computer 211 has been interrupted during a call, call center server 218 will utilize the functions of control computer 202 to reroute the call through public switching telephone network 201 to telephone 216.

Figure 3:
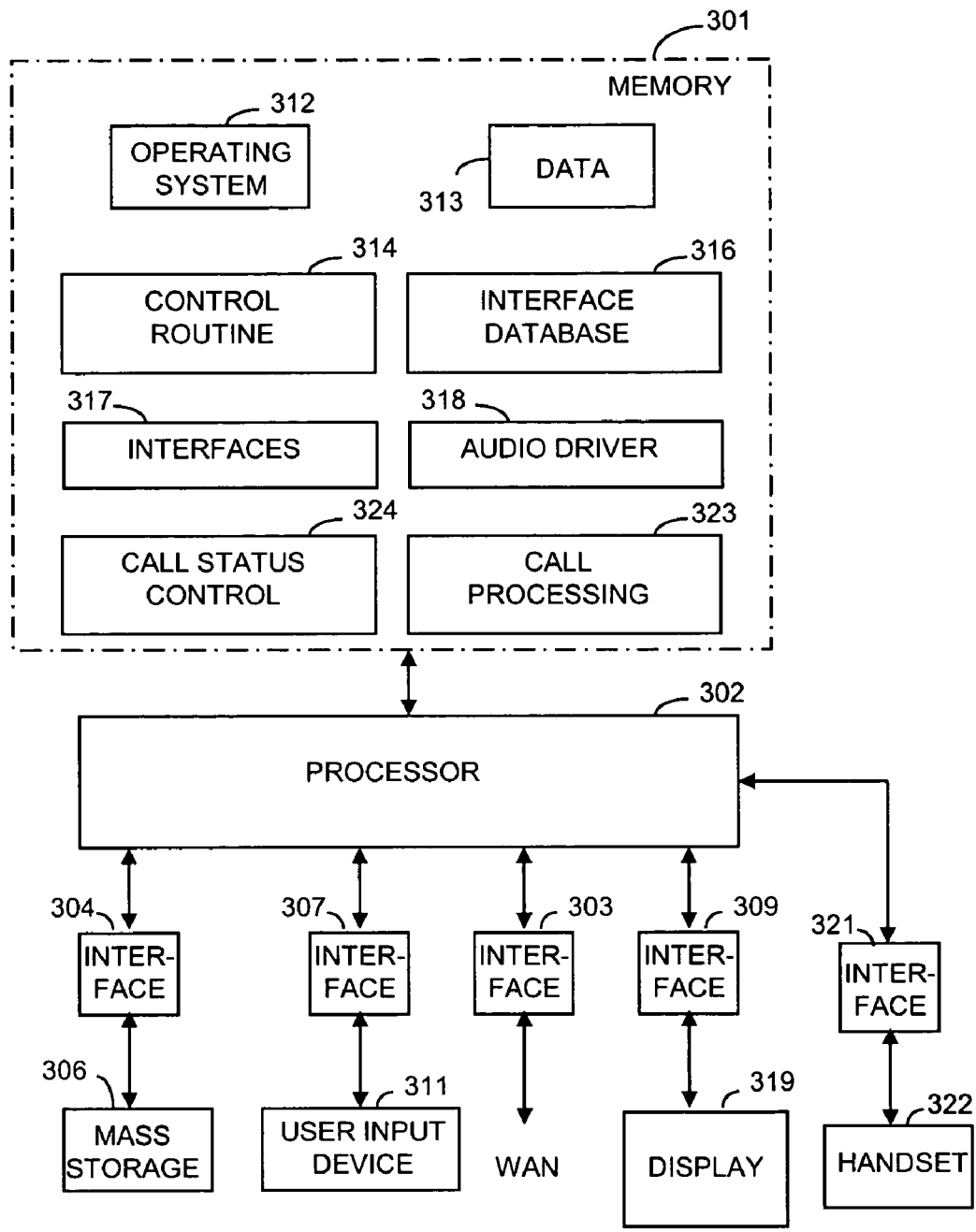
FIG. 3 illustrates, in block diagram form, an embodiment of a computer for utilization by a remote agent.

FIG. 3 illustrates, in block diagram form, one embodiment of a computer such as computer 113 or 211. Processor 302 provides the overall control for the functions of a computer by executing programs and storing and retrieving data from memory 301. Processor 302 connects to WAN 119 or 204 via interface 303. Processor 302 interfaces to user input device 311 via interface 307 and connects to display 319 via interface 309. Processor 302 performs the operations of a computer by executing the routines illustrated in memory 301. Interface 321 and handset 322 allow the implementation of a soft IP phone.

Operating system 312 provides the overall control and the necessary protocol operations. Operating system routine 312 provides all control functions required to implement the TCP/IP protocol as is well known to those skilled in the art. Data is stored in data block 313. Interface database 316 stores preferences and options that define the user interface. Overall control is performed by control routine 314. The communication and control of the various interfaces illustrated in FIG. 3 is provided by interfaces routine 317. Audio driver 318 controls the reproduction of sounds. Call processing routine 323 and call status control routine 324 provide control for the telephony operations.

To better understand the operation of the embodiment illustrated in FIG. 1, consider the following example. Call center system 100 receives an incoming call from a client who is utilizing telephone 122 via public switching telephone network 116. Control computer 101 is responsive to the incoming call to determine whether an internal agent or a remote agent should handle the call. As is well known in the call center art, the incoming call is normally placed in a queue and the first available agent, internal or remote, who has the necessary skill level receives the incoming call. Assume that the incoming call is directed to the agent utilizing personal computer 111. The incoming call is set up via a path through CO trunks 109, switching network 105, network trunk 106 and WAN 119 to personal computer 111. The path that is set up via network trunk 106 and WAN 119 not only contains voice information, control information, but also data that control computer 101 directs to personal computer 111 so that the remote agent can meet the needs of the client. Call center system 100 may use a separate server to extract and transmit the data required to help the client as is well known in the art. In addition, it is known for the data to be sent directly from the separate server to the agent via WAN 119.

At predefined intervals, personal computer 111 transmits a control message to control computer 101 advising control computer 101 that the path is still set up through WAN 119. If WAN 119 interrupts the path to personal computer 111, control computer 101 will become aware of this situation after a predefined interval has elapsed and no message is received from personal computer 111. Upon detection of this event, control computer 101 utilizes voice response system 123 to inquire from the client whether the client wants to (1) to leave a voice message for the remote agent on voice mail system 110, (2) be transferred to another agent, or (3) wait to see if the call path is reestablished. If the remote agent had been utilizing personal computer 113, a fourth choice is made available to the client by control computer 101 and that is to set up a voice call to telephone 121 so that the agent can at least finish speaking with the client. The paths being established in WAN 119 are VoIP paths. One skilled in the art could readily envision networking techniques for determining path interruptions.

Consider the example now with respect to the embodiments illustrated in FIG. 2. In the embodiment where call center server 218 is not present and all call center operations are being performed by control computer 202, the operations may be very similar to those performed by control computer 101 of FIG. 1. The voice response system would be part of service circuits 206. The calls would be first received from public switching network 201 via IP trunks 203 and would be routed to control computer 202 for providing the overall call functions. The voice information would be conveyed from IP trunks 203 via WAN 204 to the proper personal computer being utilized by the agent that was handling the incoming call. Note, that in FIG. 2 there is no difference between how an internal agent is connected to calls versus a remote agent. However, WAN 204 is shown in a very simplified form and would comprise a local LAN plus a regional network such as the Internet.

In the second embodiment illustrated in FIG. 2, call center server 218 is performing the call center operations and control computer 202 is simply providing the necessary control functions so that calls can be received and directed by call center server 218 by the transmission of commands to control computer 202. When an agent becomes active on a personal computer, the agent contacts call center server 218 which then makes the VoIP address for the agent active on control computer 202. In addition, any incoming calls received from public switching telephone network 201 are directed by control computer 202 to call center server 218 to determine which agent should handle the incoming call.

FIG. 3 illustrates, in block diagram form, one embodiment of a computer such as computer 113 or 211. Processor 302 provides the overall control for the functions of a computer by executing programs and storing and retrieving data from memory 301. Processor 302 connects to WAN 119 or 204 via interface 303. Processor 302 interfaces to user input device 311 via interface 307 and connects to display 319 via interface 309. Processor 302 performs the operations of a computer by executing the routines illustrated in memory 301. Interface 321 and handset 322 allow the implementation of a soft IP phone.

Operating system 312 provides the overall control and the necessary protocol operations. Operating system routine 312 provides all control functions required to implement the TCP/IP protocol as is well known to those skilled in the art. Data is stored in data block 313. Interface database 316 stores preferences and options that define the user interface. Overall control is performed by control routine 316. The communication and control of the various interfaces illustrated in FIG. 3 is provided by interfaces routine 317. Audio driver 318 controls the reproduction of sounds. Call processing routine 323 and call status control routine 324 provide control for the telephony operations.

Figure 4:
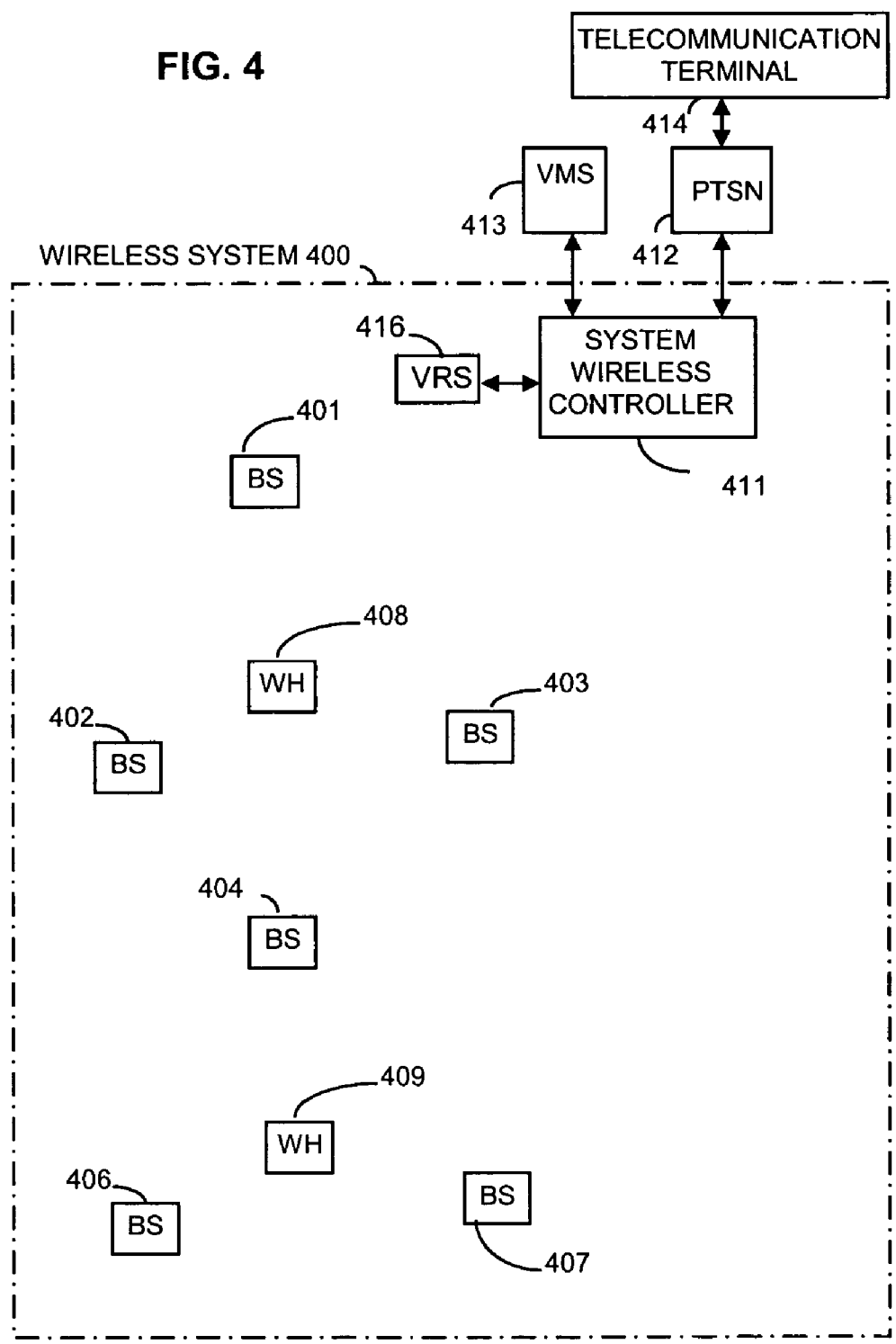
FIG. 4 illustrates, in block diagram form, an embodiment of a wireless switching system.

FIG. 4 illustrates, in block diagram form, an embodiment of the invention. In wireless system 400, system wireless controller 411 is providing overall control of the wireless network composed of base stations 404-407 which are servicing handsets 408-409. System wireless controller 411 also interfaces to public telephone switching network (PTSN) 412 and provides voice messaging support for the wireless handsets by interfacing to voice messaging system (VMS) 413.

Although, system wireless controller 411 is illustrated as being connected to the PTSN 412, system wireless controller 411 could also be connected to a private switching system such as a PBX. One skilled in the art would readily realize that wireless system 400 could be an integral part of a PBX.

To understand the operation of wireless system 400 when a call is disconnect due to a transmission problem, consider the following example. Wireless handset 408 is engaged in a call with telecommunication terminal 414. If system wireless controller 411 detects a transmission interruption in communication with wireless handset 408, system wireless controller 411 utilizes voice response system 416 to inquire from the user of telecommunication terminal whether the user wants to (1) to leave a voice message for the user of wireless handset 408 on voice mail system 413, (2) be transferred to another telephone, or (3) wait to see if the call path is reestablished.

Figure 5:
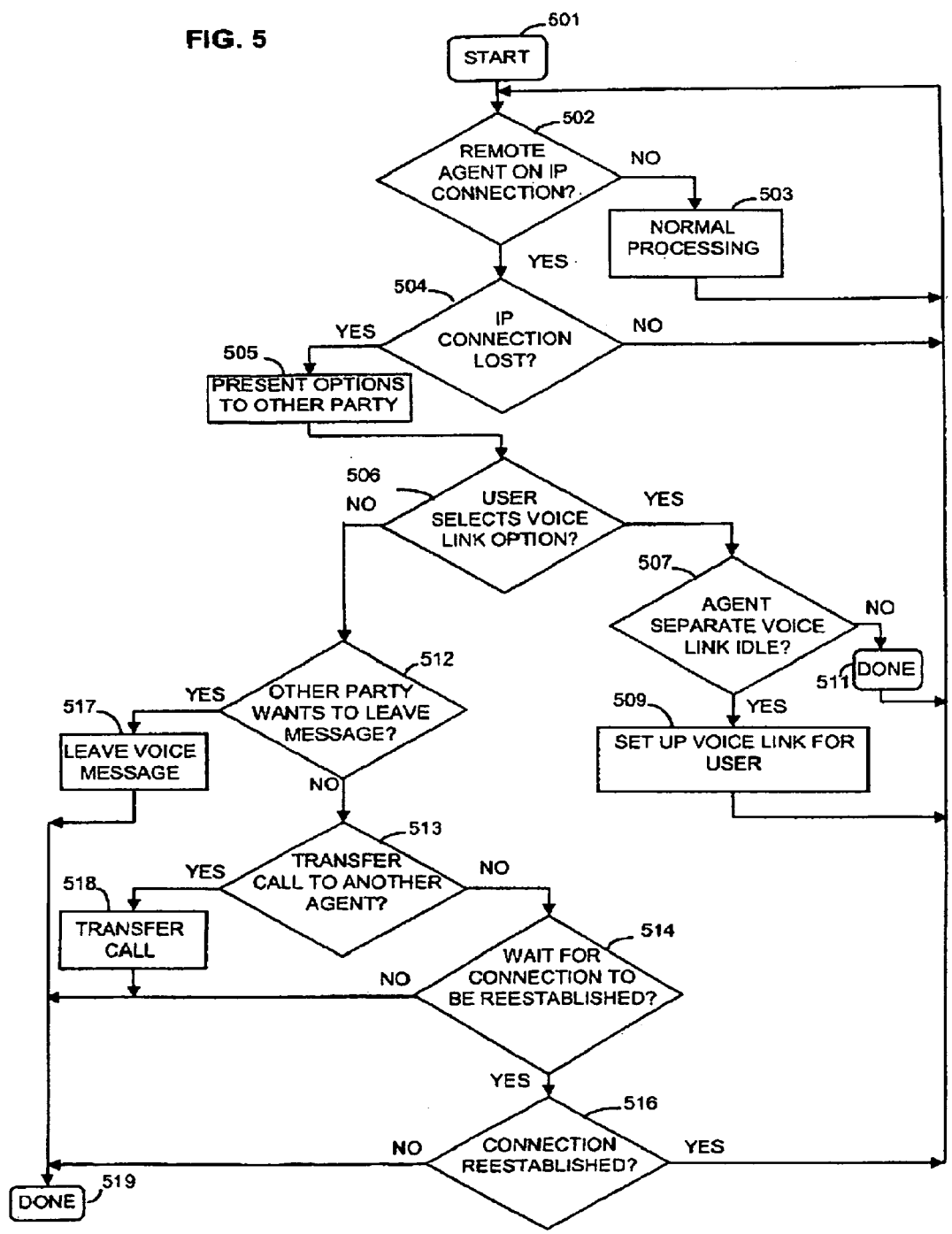
FIGS. 5 and 6 illustrate flowcharts of embodiments.

FIG. 5 illustrates, in flowchart form, operations performed by an embodiment for implementing call center operations. After being started in block 501, decision block 502 determines if the agent being checked is a remote agent operating over an IP or other types of packet switched network connections. If the answer is no, block 503 performs normal processing before transferring control back to decision block 502. If the answer in decision block 502 is yes, decision block 504 determines if the IP connection has been lost. If the answer is no, control is transferred back to decision block 502. If the answer in decision block 504 is yes, control is transferred to block 505. Block 505 presents the options that are available to the other party before transferring control to decision block 506.

Decision block 506 first checks to see if the other party selected the voice link option whereby the other party will be connected to the remote agent via a voice only link. If the answer is yes, decision block 507 determines if the agent's voice link is idle. If the answer is no, the call with the other party is terminated by block 511. Note, that block 505 would only be present this option to the other party has a separate voice link. If the answer in decision block 507 is yes, block 509 sets up the voice link between the agent and the other party before transferring control back to decision block 502.

Returning to decision block 506, if the answer is no, decision block 512 determines if the other party wants to leave a voice message for the agent. If the answer is yes, the other party is allowed to leave the voice message by execution of block 517 before control is transferred to block 519 which terminates the call.

If the answer in decision block 512 is no, decision block 513 determines if the other party wants to be transferred to another agent. If the answer is yes, execution of block 518 transfers the other party to another agent before terminating operation in block 519.

If the answer in decision block 513 is no, decision block 514 determines if the other party wants to wait for the IP connection to be established. If the answer no, control is transferred to block 519. If the answer is yes in decision block 514, decision block 516 waits a predetermined amount of time testing to see if the connection has been reestablished. If the answer is no or the connection is not reestablished, control is transferred to block 519. If the answer in decision block 516 is yes and the connection is reestablished, control is transferred back to decision block 502.

Figure 6:
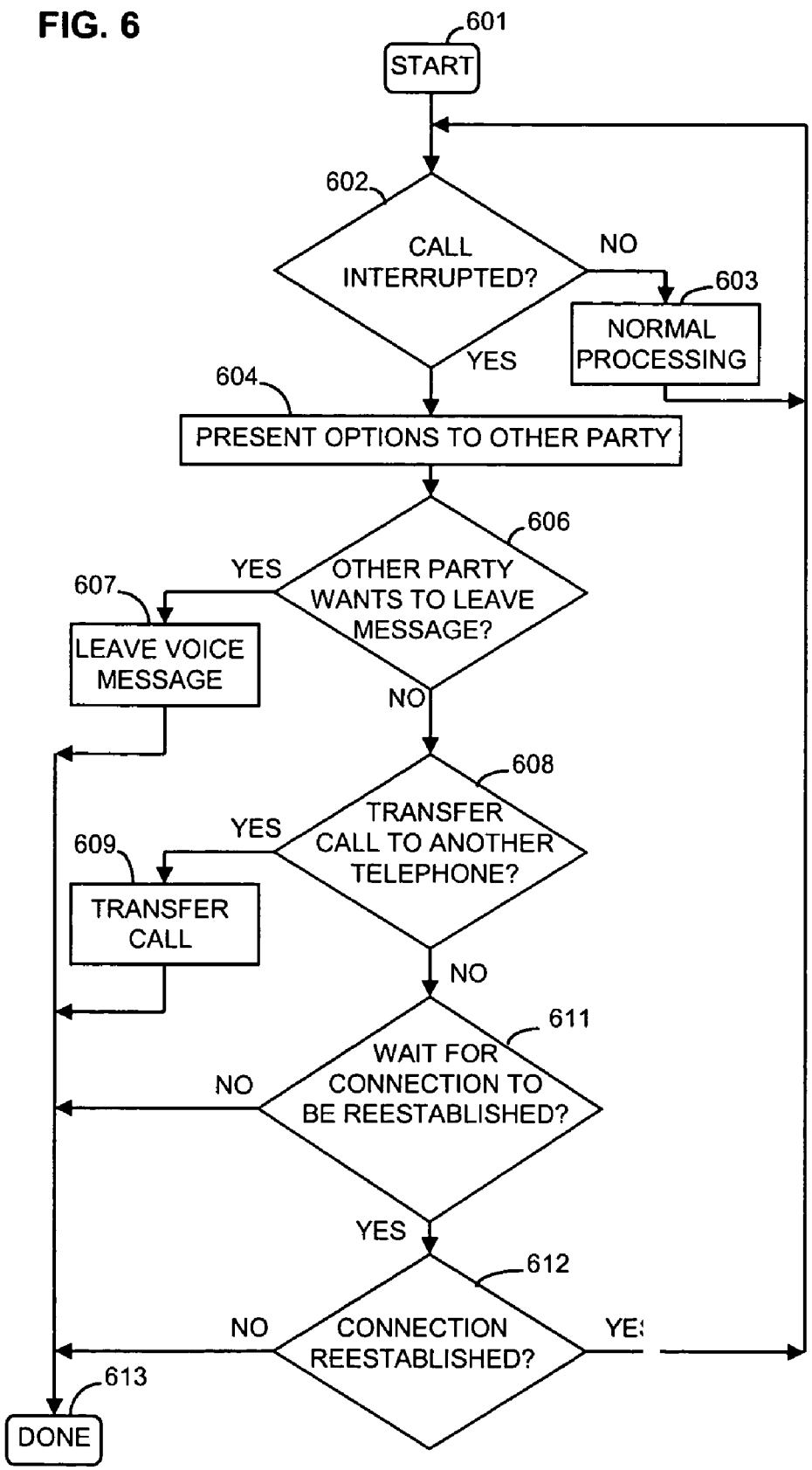

FIG. 6 illustrates, in flowchart form, operations performed by an embodiment to enhance call service for a wireless/cellular telephone. After being started in block 601, decision block 602 determines if the call has been interrupted by the wireless link being interfered with. If the answer is no, block 603 performs normal processing before transferring control back to decision block 602. If the answer in decision block 602 is yes, block 604 presents the options available to the other party.

After execution of block 604, decision block 606 determines if the other party wants to leave a voice message. If the answer is yes, execution of block 607 allows the other party to leave a voice message before transferring to block 613 which terminates the call.

If the answer in decision block 606 is no, decision block 608 determines if the other party wants to transfer the call to another telephone. Note, this option will not be presented to the user in block 604 if there is no other telephone. If the answer is yes in decision block 608, execution of block 609 transfers the call to the other telephone before transferring control to block 613.

If the answer in decision block 608 is no, decision block 611 determines if the other party wants to wait until the connection is reestablished. If the answer is no or the connection is not reestablished, control is transferred to block 613. If the answer in decision block 611 is yes and the connection is reestablished, decision block 612 waits for a predetermined amount of time for the connection to be reestablished.

When the operations of a server or computer are implemented in software, it should be noted that the software can be stored on any computer-readable medium for use by or in connection with any computer related system or method. In the context of this document, a computer-readable medium is an electronic, magnetic, optical, or other physical device or means that can contain or store a computer program for use by or in connection with a computer related system or method. The server or computer can be embodied in any computer-readable medium for use by or in connection with an instruction execution system, apparatus, or device such as a computer-based system, processor-containing system, or other system that can fetch the instructions from the instruction execution system, apparatus, or device and execute the instructions. In the context of this document, a "computer-readable medium" can be any means that can store the program for use by or in connection with the instruction execution system, apparatus, or device. For example, the computer-readable medium can be, but is not limited to, an electronic, magnetic, optical, electromagnetic, infrared, or semiconductor system, apparatus, or device. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), and a portable compact disc read-only memory (CDROM) (optical).

In an alternative embodiment, where server or computer is implemented in hardware, server or computer can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Of course, various changes and modifications to the illustrated embodiments described above will be apparent to those skilled in the art. These changes and modifications can be made without departing from the spirit and scope of the invention and without diminishing its intending advantages.

It is therefore intended that such changes and modifications be covered by the following claims except insofar as limited by the prior art.

What is claimed is:

1. A method for processing call path interruptions by a call center, comprising the steps of:
    detecting by the call center an interruption of a call path via a first network to a first telecommunication terminal used by a call center agent during a telecommunication call for a call center transaction with a second telecommunication terminal and controlled by the call center whereby the interruption of the call path resulted from a network problem in the first network communicating the call path;
    presenting by the call center in response to the detection of the interruption of the call path for selection by the second telecommunication terminal that remains on the telecommunication call a third telecommunication terminal also used by the call center agent and interconnected to the call center via a second network to which the call center will transfer the telecommunication call whereby a message sent to the second telecommunication terminal is utilized to present the third telecommunication terminal connected via the second network to the call center to the second telecommunication terminal; and
    establishing by the call center in response to a selection by the second telecommunication terminal the telecommunication call between the second telecommunication terminal and the third telecommunication terminal used by the call center agent via the second network whereby the call center transaction is continued.

2. The method of claim 1 wherein the first telecommunication terminal is an internet protocol telecommunication terminal interconnected to the call center via the first network.

3. The method of claim 2 wherein the second network is a circuit switched network interconnecting the telecommunication call by a wired connection to the third telecommunication terminal assigned to the call center agent.

4. The method of claim 2 wherein the step of presenting comprises the step of waiting for a predefined amount of time for the telecommunication call to be re-established to the internet protocol telecommunication terminal.

5. The method of claim 1 wherein the first telecommunication terminal is a wireless telecommunication terminal.

6. The method of claim 5 wherein the step of presenting comprises the step of waiting for a predefined amount of time for the telecommunication call to be re-established to the wireless telecommunication terminal via the first network.

7. A computer-readable medium for processing call path interruptions by a call center, storing computer-executable instructions configured for:
    detecting by the call center an interruption of a call path via a first network to a first telecommunication terminal used by a call center agent during a telecommunication call for a call center transaction with a second telecommunication terminal and controlled by the call center whereby the interruption of the call path resulted from a network problem in the first network communicating the call path;
    presenting by the call center in response to the detection of the interruption of the call path for selection by the second telecommunication terminal that remains on the telecommunication call a third telecommunication terminal also used by the call center agent and interconnected to the call center via a second network to which the call center will transfer the telecommunication call whereby a message sent to the second telecommunication terminal is utilized to present the third telecommunication terminal connected via the second network to the call center to the second telecommunication terminal; and
    establishing by the call center in response to a selection by the second telecommunication terminal the telecommunication call between the second telecommunication terminal and the third telecommunication terminal used by the call center agent via the second network whereby the call center transaction is continued.

8. The computer-readable medium of claim 7 wherein the first telecommunication terminal is an internet protocol telecommunication terminal interconnected to the call center via the first network.

9. The computer-readable medium of claim 8 wherein the second network is a circuit switched network interconnecting the telecommunication call by a wired connection to the third telecommunication terminal assigned to the call center agent.

10. The computer-readable medium of claim 8 wherein the presenting comprises waiting for a predefined amount of time for the telecommunication call to be re-established to the internet protocol telecommunication terminal.

11. The computer-readable medium of claim 7 wherein the first telecommunication terminal is a wireless telecommunication terminal.

12. The computer-readable medium of claim 11 wherein the presenting comprises waiting for a predefined amount of time for the telecommunication call to be re-established to the wireless telecommunication terminal via the first network.

* * * * *